(12) United States Patent
Kurimoto et al.

(10) Patent No.: US 11,759,772 B2
(45) Date of Patent: *Sep. 19, 2023

(54) HONEYCOMB STRUCTURE

(71) Applicant: NGK Insulators, Ltd., Nagoya (JP)

(72) Inventors: Yudai Kurimoto, Nagoya (JP); Shogo Hirose, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 211 days.

This patent is subject to a terminal disclaimer.

(21) Appl. No.: 16/988,992

(22) Filed: Aug. 10, 2020

(65) Prior Publication Data

US 2021/0106983 A1 Apr. 15, 2021

(30) Foreign Application Priority Data

Oct. 11, 2019 (JP) .................. 2019-187529

(51) Int. Cl.
*B01J 21/04* (2006.01)
*B01J 35/04* (2006.01)
*B01J 35/10* (2006.01)
*B01D 46/24* (2006.01)
*B01D 39/20* (2006.01)
*B01D 53/94* (2006.01)
*F01N 3/022* (2006.01)
*F01N 3/28* (2006.01)

(52) U.S. Cl.
CPC ............. *B01J 35/04* (2013.01); *B01D 53/94* (2013.01); *B01J 21/04* (2013.01); *B01J 35/1052* (2013.01); *B01D 2255/50* (2013.01); *B01D 2255/9155* (2013.01)

(58) Field of Classification Search
CPC ........ B01J 21/04; B01J 35/04; B01J 35/1052; B01D 53/94; B01D 46/2429; B01D 39/2068; F01N 3/0222; F01N 3/2803
See application file for complete search history.

(56) References Cited

U.S. PATENT DOCUMENTS 7,504,359 B2 * 3/2009 Ogyu .................. F01N 3/2828
502/527.19
7,923,093 B2 * 4/2011 Melscoet-Chauvel .....................
B01D 46/24493
428/116

(Continued)

FOREIGN PATENT DOCUMENTS

JP 2013-052367 A1 3/2013

*Primary Examiner* — Cam N. Nguyen
(74) *Attorney, Agent, or Firm* — BURR PATENT LAW, PLLC

(57) ABSTRACT

A honeycomb structure includes a pillar-shaped honeycomb structure body having a porous partition wall disposed to surround a plurality of cells, wherein a major component of the partition wall is cordierite, a porosity of the partition wall is 45 to 55%, an average pore diameter of the partition wall is 8 to 19 μm, a cumulative pore volume of the partition wall is such that a pore volume ratio of the pores having a pore diameter larger than a thickness of the partition wall relative to an overall pore volume of the partition wall is 3.0% or less, and a pore volume ratio of the pores having a pore diameter of 10 μm or less relative to the overall pore volume of the partition wall is 30% or more, and a pore diameter distribution of the partition wall is a unimodal distribution, or a multimodal distribution.

6 Claims, 2 Drawing Sheets

(56) References Cited

U.S. PATENT DOCUMENTS

| | | | |
|---|---|---|---|
| 8,192,517 B2* | 6/2012 | Kunieda | F01N 3/2828 60/311 |
| 8,444,739 B2* | 5/2013 | Mizuno | B01D 46/2451 422/177 |
| 8,500,840 B2* | 8/2013 | Okazaki | C04B 38/0006 422/177 |
| 8,512,433 B2* | 8/2013 | Beall | F01N 3/0222 422/170 |
| 8,636,821 B2* | 1/2014 | Okazaki | B01D 46/24492 55/524 |
| 8,657,914 B2* | 2/2014 | Tanaka | B01D 46/2482 422/177 |
| 8,663,356 B2* | 3/2014 | Goto | B01D 46/24492 55/524 |
| 8,691,361 B2* | 4/2014 | Okazaki | B01D 46/24492 428/116 |
| 8,734,558 B2* | 5/2014 | Miyairi | B01D 46/2474 422/182 |
| 8,764,872 B2* | 7/2014 | Isoda | C04B 41/85 422/182 |
| 8,802,017 B2* | 8/2014 | Mizutani | B01D 46/2478 422/177 |
| 8,821,609 B2* | 9/2014 | Okazaki | B01D 46/2425 422/171 |
| 9,061,942 B2* | 6/2015 | Miyairi | B01D 46/24492 |
| 9,188,044 B2* | 11/2015 | Aoki | B01J 35/0006 |
| 9,303,542 B2* | 4/2016 | Aoki | B01J 35/04 |
| 9,303,543 B2* | 4/2016 | Aoki | B01J 35/0006 |
| 9,333,486 B2* | 5/2016 | Ono | B01D 46/2418 |
| 9,347,357 B2* | 5/2016 | Sugimoto | B01D 46/2484 |
| 9,487,448 B2* | 11/2016 | Miyairi | C04B 38/0006 |
| 9,550,175 B2* | 1/2017 | Shibata | B01D 46/2486 |
| 9,649,587 B2* | 5/2017 | Okazaki | C04B 35/195 |
| 9,650,928 B2* | 5/2017 | Shibata | B01D 46/2484 |
| 9,650,929 B2* | 5/2017 | Shibata | B01D 46/2494 |
| 9,707,516 B2* | 7/2017 | Goto | B01D 46/2478 |
| 9,708,958 B2* | 7/2017 | Okazaki | C04B 35/195 |
| 9,724,634 B2* | 8/2017 | Kasuga | B01D 46/2429 |
| 9,822,681 B2* | 11/2017 | Kikuchi | B01D 53/94 |
| 9,839,869 B2* | 12/2017 | Kasuga | B01D 46/2429 |
| 9,945,279 B2* | 4/2018 | Izumi | F01N 3/035 |
| 9,968,879 B2* | 5/2018 | Okazaki | B01D 46/2429 |
| 10,072,543 B2* | 9/2018 | Okazaki | C04B 35/195 |
| 10,207,223 B2* | 2/2019 | Makino | B01J 21/063 |
| 10,286,358 B2* | 5/2019 | Goto | F01N 3/0222 |
| 10,300,424 B2* | 5/2019 | Shibata | B01D 46/247 |
| 10,335,727 B2* | 7/2019 | Shibata | B01D 46/2486 |
| 10,350,532 B2* | 7/2019 | Wolff | B01D 46/82 |
| 10,369,545 B2* | 8/2019 | Yamamoto | F01N 3/2828 |
| 10,399,074 B2* | 9/2019 | Okazaki | F01N 3/28 |
| 10,540,775 B2* | 1/2020 | Sakai | B01D 46/2482 |
| 10,610,830 B2* | 4/2020 | Izumi | F01N 3/2842 |
| 10,625,195 B2* | 4/2020 | Kato | B01D 46/2429 |
| 10,653,998 B2* | 5/2020 | Yamamoto | B01D 46/247 |
| 10,675,591 B2* | 6/2020 | Kurimoto | B01J 37/0201 |
| 10,814,266 B2* | 10/2020 | Kato | B01D 46/00 |
| 10,821,390 B2* | 11/2020 | Yoshioka | B01D 46/247 |
| 10,828,630 B2* | 11/2020 | Obata | B01J 29/061 |
| 10,830,113 B2* | 11/2020 | Nagai | F01N 3/0222 |
| 10,940,419 B2* | 3/2021 | Konno | B01D 46/2474 |
| 11,058,983 B2* | 7/2021 | Yasui | B01D 46/2482 |
| 11,065,571 B2* | 7/2021 | Yasui | B01D 46/2482 |
| 11,167,279 B2* | 11/2021 | Kuki | B01D 46/247 |
| 11,305,270 B2* | 4/2022 | Yamada | B01J 23/10 |
| 2008/0070776 A1* | 3/2008 | Yamaguchi | B01J 35/04 502/100 |
| 2009/0238733 A1* | 9/2009 | Ohno | B01D 46/2425 502/232 |
| 2009/0291839 A1* | 11/2009 | Kunieda | B01D 46/2474 428/116 |
| 2012/0064286 A1* | 3/2012 | Hirose | F01N 3/2828 428/116 |
| 2012/0186206 A1* | 7/2012 | Tanaka | B01D 46/2429 55/476 |
| 2012/0244042 A1* | 9/2012 | Mizutani | B01D 46/2429 422/180 |
| 2012/0317946 A1* | 12/2012 | Miyairi | B01D 46/2429 55/523 |
| 2013/0059724 A1* | 3/2013 | Hirose | B01D 46/2429 428/116 |
| 2013/0145735 A1* | 6/2013 | Motoki | C04B 35/195 55/529 |
| 2015/0258485 A1* | 9/2015 | Kikuchi | C04B 38/0006 422/177 |
| 2015/0275725 A1* | 10/2015 | Ichikawa | C04B 35/6316 428/116 |
| 2016/0271549 A1* | 9/2016 | Kikuchi | F01N 3/035 |
| 2017/0197167 A1* | 7/2017 | Shibata | B01D 46/2482 |
| 2017/0284246 A1* | 10/2017 | Kimura | B32B 18/00 |
| 2018/0214810 A1* | 8/2018 | Iida | B01D 53/944 |
| 2018/0250658 A1* | 9/2018 | Nakao | B01J 35/04 |

* cited by examiner

HONEYCOMB STRUCTURE

The present application is an application based on JP 2019-187529 filed on Oct. 11, 2019 with Japan Patent Office, the entire contents of which are incorporated herein by reference.

BACKGROUND OF THE INVENTION

Field of the Invention

The present invention relates to honeycomb structures. More specifically the present invention relates to a honeycomb structure that can be particularly suitably used for a catalyst carrier to be loaded with catalyst to purify exhaust gas.

Description of the Related Art

Currently, developed countries are examining to tighten the standards on NOx emission from diesel vehicles and tracks more. To meet such NOx emission standards, various techniques have been proposed to treat NOx in exhaust gas. One of these techniques manufactures a honeycomb structure having a porous partition wall loaded with selective catalytic reduction catalyst (hereinafter this may be called "SCR catalyst"), for example, to treat NOx in exhaust gas with the honeycomb structure for purification. That is, such a honeycomb structure is used for a catalyst carrier loaded with catalyst to purify exhaust gas.

Conventionally, when catalyst is loaded on the honeycomb structure, the catalyst is mainly loaded on the surface of the partition wall. Recently due to stricter regulations on exhaust gas from automobiles, improvement in purification performance of a honeycomb structure loaded with catalyst for purifying exhaust gas has been demanded. One of the methods to improve the purification performance may increase the amount of catalyst loaded on the honeycomb structure. For example, a technique has been proposed, which increases the porosity of the partition wall so that the pores formed in the partition wall also are loaded with the catalyst (see, for example, Patent Document 1). Another method to improve the purifying performance may be increasing the cell density of a honeycomb structure so as to increase the efficiency of contact with exhaust gas. "Increasing the cell density" means increasing the density of cells defined by the partition wall to densify the cell density of the honeycomb structure.

[Patent Document 1] JP-A-2013-052367

SUMMARY OF THE INVENTION

A honeycomb structure having the partition wall with higher porosity, however, has a problem of a decrease in isostatic strength. A honeycomb structure with higher cell density has a problem of an increase in pressure loss of the honeycomb structure. Such an increase in pressure loss due to the higher cell density can be suppressed to a certain extent by reducing the thickness of the partition wall, for example. The partition wall having a reduced thickness as well as with higher porosity as described above makes it more difficult to keep the isostatic strength and the like. Hereinafter, "reducing the thickness of a partition wall" as described above may be referred to as "thinning of a partition wall".

As described above, the honeycomb structure satisfying both of higher porosity and thinner partition wall is able to increase the amount of the catalyst loaded on the surface of the partition wall and in the pores. This honeycomb structure, however, particularly has the difficulty to achieve both of sufficient properties about the isostatic strength and pressure loss. Further, when the porosity of the partition wall increases and the loading amount and the filling rate of the catalyst in the pores of the partition wall increases, the purifying performance cannot be sufficiently improved according to the increased amount of the catalyst. That is, if the catalyst is loaded into the pores of the partition wall in the state that the catalytic reaction hardly occurs, contribution of the catalyst to the improvement of the purifying performance may be significantly reduced. Therefore, there is a demand for a honeycomb structure that effectively suppresses a decrease in isostatic strength and an increase in pressure loss while increasing the allowable amount of the catalyst that can be loaded on the partition wall and effectively utilizing the catalyst loaded in the pores.

In view of such problems of the conventional techniques, the present invention provides a honeycomb structure that effectively suppresses a decrease in isostatic strength and an increase in pressure loss while increasing the allowable amount of the catalyst that can be loaded on the partition wall and effectively utilizing the catalyst loaded in the pores.

The present invention provides the following honeycomb structure.

According to a first aspect of the present invention, a honeycomb structure is provided including a pillar-shaped honeycomb structure body having a porous partition wall disposed so as to surround a plurality of cells which serve as fluid through channel extending from a first end face to a second end face, wherein a major component of the partition wall is cordierite, a porosity of the partition wall measured by mercury press-in method is 45 to 55%, an average pore diameter of the partition wall measured by mercury press-in method is 8 to 19 µm, among pores formed in the partition wall, pores having a pore diameter larger than a thickness T1 of the partition wall are referred to as first pores, and pores having a pore diameter of 10 µm or less are referred to as second pores, a cumulative pore volume of the partition wall measured by mercury press-in method is such that a pore volume ratio of the first pores relative to an overall pore volume of the partition wall is 3.0% or less, and a pore volume ratio of the second pores relative to the overall pore volume of the partition wall is 30% or more, and a pore diameter distribution of the partition wall is a unimodal distribution, or is a multimodal distribution in which the difference between a value of a pore diameter of a maximum peak of the pore volume and a value of a pore diameter of a quasi-maximum peak second to the maximum peak is 30 µm or less.

According to a second aspect of the present invention, the honeycomb structure according to the first aspect is provided, wherein the porosity of the partition wall measured by mercury press-in method is 47 to 53%, the average pore diameter the partition wall measured by mercury press-in method is 9 to 18 µm, the cumulative pore volume of the partition wall measured by mercury press-in method is such that a pore volume ratio of the first pores relative to an overall pore volume of the partition wall is 2.5% or less, and a pore volume ratio of the second pores relative to the overall pore volume of the partition wall is 35% or more, and the pore diameter distribution of the partition wall is a unimodal distribution, or is a multimodal distribution in which a difference between a value of a pore diameter of a maximum peak of the pore volume and a value of a pore diameter of a quasi-maximum peak second to the maximum peak is 28 μm or less.

According to a third aspect of the present invention, the honeycomb structure according to the first or second aspects is provided, wherein a thickness T1 of the partition wall is 64 to 104 μm.

According to a fourth aspect of the present invention, the honeycomb structure according to any one of the first to third aspects is provided, wherein a cell density of the honeycomb structure body is 85 to 101 cells/cm².

According to a fifth aspect of the present invention, the honeycomb structure according to any one of the first to fourth aspects is provided, wherein the pore diameter distribution of the partition wall is a unimodal distribution or a bimodal distribution.

According to a sixth aspect of the present invention, the honeycomb structure according to any one of the first to fifth aspects is provided, wherein the partition wall includes 90 mass % or more of cordierite in the constituent components.

The honeycomb structure of the present invention has the remarkable effect of effectively suppressing a decrease in isostatic strength and an increase in pressure loss while increasing the allowable amount of the catalyst that can be loaded on the partition wall and effectively utilizing the catalyst loaded in the pores. To this end, the honeycomb structure of the present invention can be suitably used as a catalyst carrier to be loaded with catalyst for purifying of exhaust gas, and improve the purifying performance for exhaust gas while effectively suppressing a decrease in isostatic strength and an increase in pressure loss.

DESCRIPTION OF THE PREFERRED EMBODIMENTS

The following describes embodiments of the present invention, and the present invention is not limited to the following embodiments. The present invention is to be understood to include the following embodiments, to which modifications and improvements are added as needed based on the ordinary knowledge of a person skilled in the art without departing from the scope of the present invention.

(1) Honeycomb Structure

Figure 1:
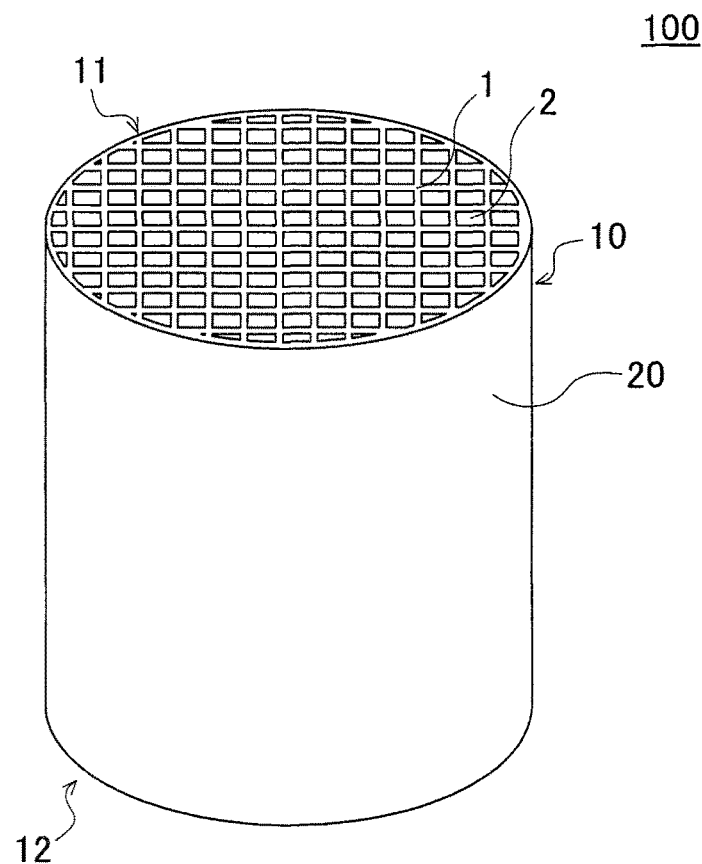
FIG. 1 is a perspective view schematically showing an embodiment of the honeycomb structure of the present invention.
Figure 2:
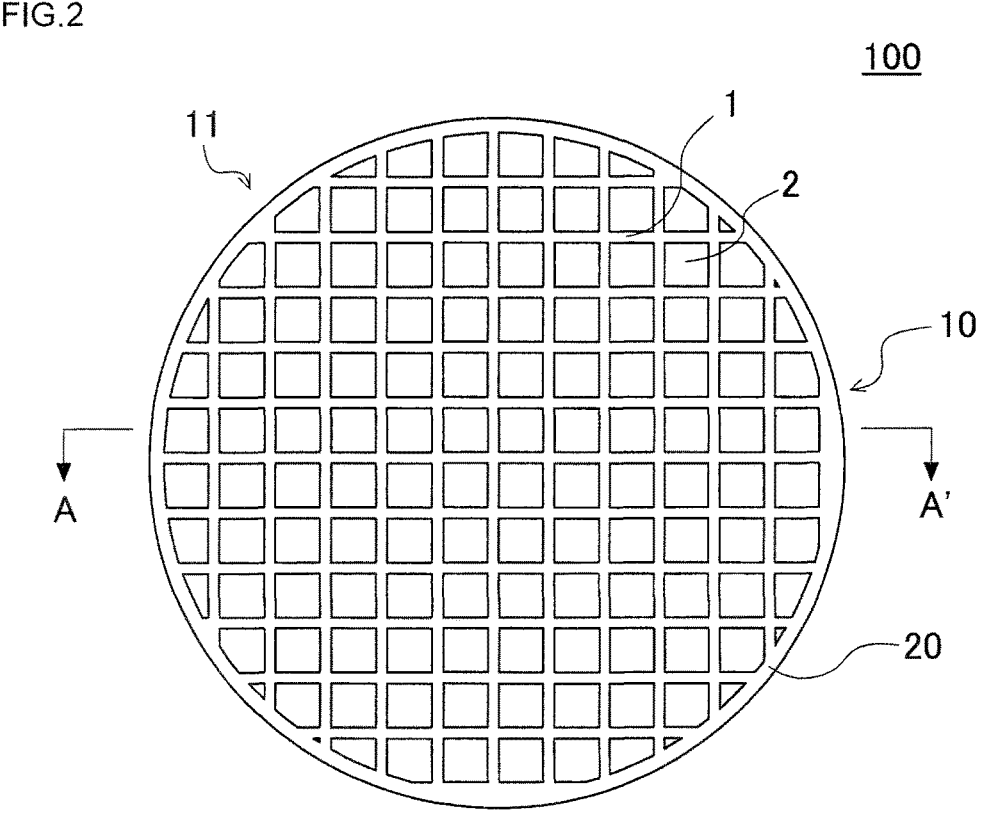
FIG. 2 is a plan view showing the first end face side of the honeycomb structure of FIG. 1.
Figure 3:
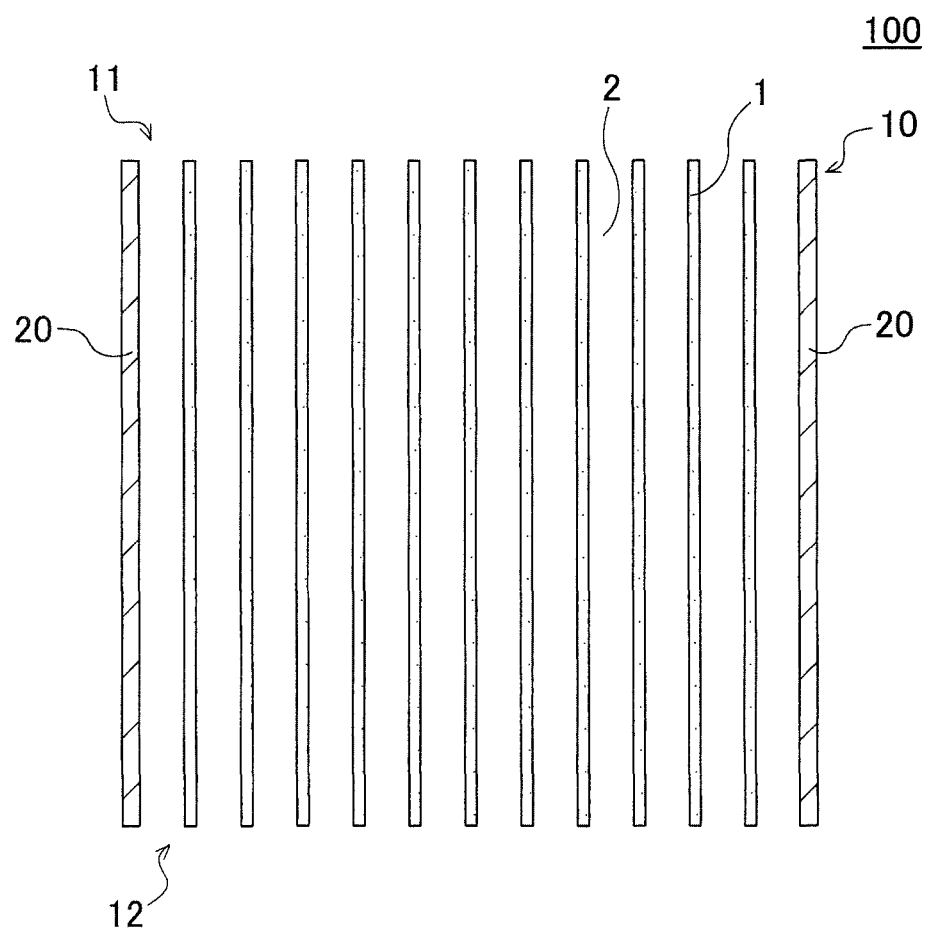
FIG. 3 is a sectional view schematically showing the section taken along A-A' of FIG. 2.

An embodiment of the honeycomb structure in accordance with the present invention is a honeycomb structure 100 as shown in FIGS. 1 to 3. FIG. 1 is a perspective view schematically showing an embodiment of the honeycomb structure of the present invention. FIG. 2 is a plan view showing a first end face side of the honeycomb structure of FIG. 1. FIG. 3 is a sectional view schematically showing the section taken along A-A' of FIG. 2.

As shown in FIGS. 1 to 3, the honeycomb structure 100 of the present embodiment includes a pillar-shaped honeycomb structure body 10 having a first end face 11 and a second end face 12. The honeycomb structure body 10 has a porous partition wall 1 disposed so as to surround a plurality of cells 2 which serve as fluid through channel extending from the first end face 11 to the second end face 12. In the honeycomb structure 100 of the present embodiment, the honeycomb structure body 10 is configured to have a round pillar shape, and further includes a circumferential wall 20 on the circumferential side surface. That is, the circumferential wall 20 is arranged so as to surround the grid-patterned partition wall 1.

The honeycomb structure 100 of the present embodiment has the technical features in the material and the thickness of the partition wall 1 and in the pore diameter and the pore volume of the pores formed in the partition wall 1. Hereinafter, the thickness (μm) of the partition wall 1 is referred to as "T1". "T1" may be referred to as "thickness T1". Among the pores formed in the partition wall 1, two kinds of pores having the following values of the pore diameter measured by the mercury press-in method are referred to as "first pores" and "second pores". The "first pores" are pores having a pore diameter larger than the thickness T1 of the partition wall 1. The "second pores" are pores having a pore diameter of 10 μm or less.

The major component of the partition wall 1 in the honeycomb structure 100 is cordierite. The "major component" here refers to a component contained with the ratio of 50 mass % or more in the materials constituting the partition wall 1. Preferably the partition wall 1 includes 90 mass % or more of cordierite in the constituting components, and more preferably 95 mass % or more.

The honeycomb structure 100 has porosity of the partition wall 1 measured by mercury press-in method is 45 to 55%, and has average pore diameter of the partition wall 1 measured by mercury press-in method is 8 to 19 μm. A cumulative pore volume of the partition wall 1 measured by mercury press-in method is such that a pore volume ratio of the first pores relative to the overall pore volume of the partition wall 1 is 3.0% or less, and a pore volume ratio of the second pores relative to the overall pore volume of the partition wall 1 is 30% or more. The pore diameter distribution of the partition wall 1 is a unimodal distribution, or is a multimodal distribution in which a difference between the value of the pore diameter of the maximum peak of the pore volume and the value of the pore diameter of the quasi-maximum peak second to the maximum peak is 30 μm or less. Hereinafter, "the porosity of the partition wall 1 measured by the mercury press-in method" and "the average pore diameter of the partition wall 1 measured by the mercury press-in method" may be referred to simply as "the porosity of the partition wall 1" and "the average pore diameter of the partition wall 1", respectively.

The honeycomb structure 100 of the present embodiment has the remarkable effect of effectively suppressing a decrease in isostatic strength and an increase in pressure loss while increasing the allowable amount of the catalyst that can be loaded on the partition wall 1 and effectively utilizing the catalyst loaded in the pores for the catalytic reaction. The honeycomb structure 100 of the present embodiment is therefore suitably used as a catalyst carrier to be loaded with catalyst for purifying of exhaust gas, and improves the purifying performance for exhaust gas while effectively suppressing a decrease in isostatic strength and an increase in pressure loss.

If the porosity of the partition wall 1 is less than 45%, the obtained honeycomb structure satisfying the other configurations as described above may fail to keep sufficient pore volume capable of being filled with the catalyst, for example. When the loading amount of the catalyst increases, the honeycomb structure significantly has a difficulty to suppress an increase in pressure loss. If the porosity of the partition wall 1 exceeds 55%, the obtained honeycomb structure satisfying the other configurations as described above significantly has a difficulty to suppress a decrease in isostatic strength, for example. Preferably the porosity of the partition wall is 47 to 53%, and more preferably is 49 to 52%.

If the average pore diameter of the partition wall 1 is less than 8 μm, the obtained honeycomb structure satisfying the other configurations as described above significantly has a difficulty to suppress an increase in pressure loss, for example. If the average pore diameter of the partition wall 1 exceeds 19 μm, the obtained honeycomb structure satisfying the other configurations as described above significantly has a difficulty to suppress a decrease in isostatic strength, for example. Preferably the average pore diameter of the partition wall is 9 to 18 μm, and more preferably 10 to 17 μm.

If the pore volume ratio of the first pores relative to the overall pore volume of the partition wall 1 exceeds 3.0% and/or the pore volume ratio of the second pores relative to the overall pore volume of the partition wall 1 is less than 30%, the obtained honeycomb structure significantly has a difficulty to suppress both of a decrease in isostatic strength and an increase in pressure loss. Hereinafter, the pore volume ratio of the first pores relative to the overall pore volume of the partition wall 1 may be simply referred to as the "pore volume ratio of the first pores". The pore volume ratio of the second pores relative to the overall pore volume of the partition wall 1 may be simply referred to as the "pore volume ratio of the second pores". Preferably the pore volume ratio of the first pores is 2.5% or less and the pore volume ratio of the second pores is 35% or more, and more preferably the pore volume ratio of the first pores is 2.3% or less and the pore volume ratio of the second pores is 40% or more.

As described above, the honeycomb structure 100 of the present embodiment has a pore diameter distribution of the partition wall 1 that is a unimodal distribution or is a multimodal distribution in which a difference between the value of the pore diameter of the maximum peak of the pore volume and the value of the pore diameter of the quasi-maximum peak is 30 μm or less. Hitherto, the honeycomb structures containing cordierite as the main component may be manufactured by adding a desired amount of pore former to a cordierite forming raw material so as to adjust the porosity of the partition wall, for example. Such a porous partition wall including the cordierite forming raw material added pore former has large pores having a relatively large pore diameter due to the pore former and micropores having a relatively small pore diameter due to the powder of the cordierite forming raw material. Therefore, the pore diameter distribution of such a partition wall may indicate a multimodal distribution (bimodal distribution) constituting of a distribution of large pores mainly due to the pore former and a distribution of micropores mainly due to the powder of the cordierite forming raw material. The honeycomb structure 100 of the present embodiment is manufactured by adjusting the particle diameter and the additive amount of the pore former, for example, so as to bring the distribution of large pores closer to the distribution of micropores. The resultant honeycomb structure therefore has a pore diameter distribution that is a unimodal distribution or is a multimodal distribution in which a difference between the value of the pore diameter of the maximum peak of the pore volume and the value of the pore diameter of the quasi-maximum peak is 30 μm or less. This configuration of the honeycomb structure effectively suppresses a decrease in isostatic strength and an increase in pressure loss while increasing the allowable amount of the catalyst that can be loaded on the partition wall 1 and effectively utilizing the catalyst loaded in the pores. If a difference between the value of the pore diameter of the maximum peak of the pore volume and the value of the pore diameter of the quasi-maximum peak exceeds 30 μm, the pores having a larger pore diameter will be preferentially filled with the catalyst. In this case, an increased loading amount of the catalyst does not lead to a corresponding high purifying performance. In addition, such a pore diameter distribution reduces the isostatic strength when the porosity of the partition wall 1 increases. In the honeycomb structure 100 of the present embodiment, when the partition wall 1 has a pore diameter distribution that is a multimodal distribution in which a difference between the value of the pore diameter of the maximum peak of the pore volume and the value of the pore diameter of the quasi-maximum peak is 30 μm or less, it is preferable that the multimodal distribution is substantially a bimodal distribution consisting of the distribution of large pores and the distribution of micropores.

The porosity and the average pore diameter of the partition wall 1 can be measured using Autopore 9500 (product name) produced by Micromeritics Co, for example. To measure the porosity and the average pore diameter, a part of the partition wall 1 may be cut out from the honeycomb structure 100 to prepare a test piece for the measurement, and the porosity and the average pore diameter can be measured by using the prepared test piece.

The overall pore volume as well as the pore volumes of the first pores and the second pores of the partition wall 1 can be obtained from the cumulative pore volume of the partition wall 1, which is measured by mercury press-in method. The cumulative pore volume of the partition wall 1 can be measured using Autopore 9500 (product name) produced by Micromeritics Co, for example. Specifically the cumulative pore volume of the partition wall 1 can be measured by the following method. Firstly a part of the partition wall 1 is cut out from the honeycomb structure 100 to prepare a test piece for the measurement of the cumulative pore volume. The size of the test piece is not limited especially, which preferably is a cuboid of about 10 mm, about 10 mm and about 10 mm in length, width, and height, respectively, for example. A part of the partition wall 1 to be cut out as the test piece is not limited especially. Preferably the test piece is cut out from a part close to the center in the axial direction of the honeycomb structure body 10. The prepared test piece is placed in a measurement cell of a measurement apparatus, and the pressure in this measurement cell is reduced. Next, mercury is introduced into the measurement cell. Next, the mercury introduced in the measurement cell is pressurized, and the volume of the mercury pushed into the pores present in the test piece during the pressurization is measured. At this time, as the pressure applied to the mercury increases, the mercury will be pushed into pores having a larger pore diameter first and then enters pores having a smaller pore diameter. Thus the relationship between the "pore diameter of the pores formed in the test piece" and the "cumulative pore volume" can be obtained based on the relationship between the "pressure applied to the mercury" and the "volume of the mercury pushed into the pores". The "cumulative pore volume" is a value obtained by accumulating the pore volume values from a smallest pore diameter to a certain pore diameter. For instance, the pore volume of the second pores can be obtained as a value that is calculated by accumulating the pore volume values of the pores from a smallest pore diameter to a pore diameter of 10 µm (i.e., the pores with a pore diameter of 10 µm or less). Then the pore volume ratio (%) of the second pores can be obtained as the percentage ($pv_1/PV_{all} \times 100\%$) of the ratio of the pore volume $pv_1$ of the pores having pore diameters of 10 µm or less relative to the overall pore volume $PV_{all}$ represented by the cumulative pore volume. Similarly the pore volume of the first pores also can be obtained as a value that is calculated by accumulating the pore volume values of the pores having a pore diameter larger than the thickness T1 of the partition wall 1. The pore volume ratio (%) of the first pores also can be obtained by the method similar to that for the pore volume ratio (%) of the second pores.

The thickness T1 of the partition wall 1 can be measured with a scanning electron microscope or a microscope, for example. The partition wall 1 preferably has a thickness T1 of 64 to 104 µm, more preferably 76 to 102 µm, and particularly preferably 81 to 97 µm. The honeycomb structure 100 of the present embodiment can effectively suppress a decrease in isostatic strength, and so enables thinning of the partition wall 1 as described above. The honeycomb structure 100 of the present embodiment therefore realizes low pressure loss of the honeycomb structure 100. If the thickness T1 of the partition wall 1 is less than 64 µm, the thickness T1 of the partition wall 1 is too small, so that the honeycomb structure may fail to have sufficient strength. If the thickness T1 of the partition wall 1 exceeds 104 µm, pressure loss of the honeycomb structure 100 may increase. Since the thickness T1 of the partition wall 1 is a value that serves as a reference for the first pores, the thickness T1 of the partition wall 1 exceeding the numerical range described above may adversely affect the parameters relating to the pore volume ratio of the first pores.

The honeycomb structure 100 of the present embodiment can increase the filling rate of the pores of the partition wall 1 with catalyst because of high porosity of the partition wall 1. The honeycomb structure 100 therefore can suppress an increase in pressure loss after loading with the catalyst to purify exhaust gas. In this way, the honeycomb structure 100 can suppress an increase of pressure loss while increasing the amount of catalyst for loading, for example, and can achieve both of "improving the purification performance" and "suppressing an increase in pressure loss".

Preferably in the honeycomb structure 100 of the present embodiment, the partition wall 1 has porosity of 47 to 53% and the average pore diameter of 9 to 18 µm, the pore volume ratio of the first pores is 2.5% or less, and the pore volume ratio of the second pores is 35% or more. When the pore diameter distribution of the partition wall 1 is a multimodal distribution, more preferably a difference between the value of the pore diameter of the maximum peak of the pore volume and the value of the pore diameter of the quasi-maximum peak is 28 µm or less.

The shape of the cells 2 formed in the honeycomb structure body 10 is not limited especially. For instance, in a section orthogonal to the extending direction of the cells 2, the cells 2 may have a polygonal shape, such as a triangle, a quadrangle, a pentagon, a hexagon, and an octagon. Preferably the shape of the cells 2 is a triangle, a quadrangle, a pentagon, a hexagon, or an octagon. For the shape of the cells 2, all of the cells 2 may have the same shape, or the cells 2 may have different shapes. For instance, although not shown, quadrangular cells and octagonal cells may be combined. For the size of the cells 2, all of the cells 2 may have the same size, or the cells 2 may have different sizes. For instance, although not shown, some of the plurality of cells may be larger, and other cells may be smaller relatively. In the present invention, the cells 2 refer to a space surrounded with the partition wall 1.

Preferably the cells 2 defined by the partition wall 1 have cell density that is 85 to 101 cells/cm$^2$, and more preferably 90 to 97 cells/cm$^2$. The honeycomb structure 100 having such a configuration of the present embodiment can be suitably used as a member for purification (e.g., a catalyst carrier or a filter) to purify exhaust gas emitted from an automobile engine.

The circumferential wall 20 of the honeycomb structure body 10 may be configured integrally with the partition wall 1 or may be composed of a circumference coat layer formed by applying a circumference coating material so as to surround the partition wall 1. Although not shown, the circumferential coat layer can be provided on the circumferential side of the partition walls after the partition walls and the circumferential walls are integrally formed and then the formed circumferential wall is removed by a known method, such as grinding, in a manufacturing process.

The shape of the honeycomb structure body 10 is not limited especially. Examples of the shape of the honeycomb structure body 10 include a pillar shape in which the first end face 11 and the second end face 12 have a shape, such as a circle, an ellipse, or a polygon.

The size of the honeycomb structure body 10, including the length from the first end face 11 to the second end face 12 and the size of a section orthogonal to the extending direction of the cells 2 of the honeycomb structure body 10, is not limited especially. The sizes of the honeycomb structure 100 of the present embodiment may be selected appropriately so that the honeycomb structure can have the optimum purification performance when it is used as a member to purify exhaust gas. For instance, the length from the first end face 11 to the second end face 12 of the honeycomb structure body 10 is preferably 76.2 to 228.6 mm, and more preferably 101.6 to 203.2 mm. The area of a section orthogonal to the extending direction of the cells 2 of the honeycomb structure body 10 is preferably 24829 to 99315 mm$^2$, and more preferably 28502 to 85634 mm$^2$.

In the honeycomb structure 100 of the present embodiment, the partition wall 1 defining the plurality of cells 2 may be loaded with catalyst to purify exhaust gas. The partition wall 1 being loaded with catalyst refers to loading of the catalyst on the surface of the partition wall 1 or in the pores formed in the partition wall 1. The honeycomb structure 100 of the present embodiment can suppress a decrease in isostatic strength and an increase in pressure loss, and so enables increasing the loading amount of catalyst by high porosity and thinning of the partition wall 1, for improving the purifying performance.

(2) Method for Manufacturing a Honeycomb Structure

A method for manufacturing the honeycomb structure of the present invention is not limited especially, and the honeycomb structure can be manufactured by the following method, for example. Firstly a kneaded material having plasticity is prepared to produce a honeycomb structure body. The kneaded material to produce a honeycomb structure body can be prepared by adding additives, such as binder, pore former and water as needed to a material selected as raw material powder from the aforementioned materials suitable for the honeycomb structure body. Examples of the raw material powder include a cordierite forming raw material. The cordierite forming raw material is a raw material that forms cordierite after firing. Specifically the cordierite forming raw material is a raw material formulated to have a chemical composition in the range of 42 to 56 mass % of silica, 30 to 45 mass % of alumina and 12 to 16 mass % of magnesia.

To prepare the kneaded material, the particle diameter of the pore former can be adjusted to adjust the pore diameter distribution of the partition wall. For example, the average particle diameter of the pore former is preferably smaller than the thickness T1 of the partition wall. Using such a pore former enables the pore volume ratio of the first pores that is 3.0% or less and the pore volume ratio of the second pores that is 30% or more.

Next, the prepared kneaded material is extruded, thereby producing a pillar-shaped honeycomb formed body having a partition wall defining a plurality of cells and a circumferential wall arranged so as to surround this partition wall. Preferably the thickness of the partition wall of the honeycomb formed body is set so that the partition wall of the honeycomb structure after firing has a desired thickness T1 in accordance with the average particle diameter of the pore former added to the raw material powder.

Next, the obtained honeycomb formed body is dried by microwaves and hot air, for example. Next, the honeycomb formed body is fired to manufacture a honeycomb structure. The firing temperatures and the firing atmosphere differ according to the raw material, and those skilled in the art can select the firing temperature and the firing atmosphere that are the most suitable for the selected material.

EXAMPLES

The following describes the present invention more specifically by way of examples, and the present invention is by no means limited to these examples.

Example 1

2.5 parts by mass of pore former, 0.5 part by mass of dispersing medium, and 6.5 parts by mass of organic binder were added to 100 parts by mass of the cordierite forming raw material, followed by mixing and kneading to prepare a kneaded material. As the cordierite forming raw material, alumina, aluminum hydroxide, kaolin, talc, and silica were used. As the dispersing medium, water was used. As the organic binder, methylcellulose was used. As the dispersing agent, dextrin was used. As the pore former, hollow resin particulates having the average particle diameter of 28 μm were used.

Next, the kneaded material was extruded using a die for manufacturing of a honeycomb formed body to have a honeycomb formed body having a round pillar shape as the overall shape. The cells of the honeycomb formed body had a quadrangular shape.

Next, the honeycomb formed body was dried by a microwave dryer, then was dried completely by a hot-air drier, and then both end faces of the honeycomb formed body were cut so as to have predetermined dimensions. Next, the dried honeycomb formed body was degreased and fired, so as to obtain a honeycomb structure of Example 1.

The honeycomb structure of Example 1 had a round pillar shape, where the first end face and the second end face were round. The first end face and the second end face had the diameter of 266.7 mm. The honeycomb structure had the overall length in the cell extending direction of 152.4 mm. The honeycomb structure of Example 1 had the thickness T1 of the partition wall of 89 μm and the cell density of 93 cells/cm$^2$. Table 1 shows the "Diameter (mm)", the "Overall length (mm)" and the "Cell density (cells/cm$^2$)" and the "Partition wall thickness T1 (μm)" of the honeycomb structure.

TABLE 1

| | Honeycomb structure | | | Partition wall configuration | | | | | |
|---|---|---|---|---|---|---|---|---|---|
| | Diameter (mm) | Overall length (mm) | Cell density (cells/cm$^2$) | Partition wall thickness T1 (μm) | Porosity (%) | Ave. pore diameter (μm) | Pore volume ratio of 1st pores (%) | Pore volume ratio of 2nd pores (%) | Value of the pore diameter between peaks of the pore diameter distribution (μm) |
| Ex. 1 | 266.7 | 152.4 | 93 | 89 | 49 | 11 | 1.8 | 45.0 | 0 |
| Ex. 2 | 266.7 | 152.4 | 93 | 91 | 52 | 13 | 2.0 | 43.0 | 0 |
| Ex. 3 | 266.7 | 152.4 | 93 | 91 | 53 | 15 | 2.3 | 40.0 | 0 |
| Ex. 4 | 266.7 | 152.4 | 94 | 91 | 53 | 11 | 2.1 | 45.0 | 0 |
| Ex. 5 | 266.7 | 152.4 | 93 | 89 | 50 | 18 | 2.5 | 35.0 | 20 |
| Ex. 6 | 266.7 | 152.4 | 93 | 89 | 50 | 17 | 2.3 | 35.0 | 28 |
| Ex. 7 | 266.7 | 152.4 | 93 | 91 | 47 | 9 | 1.4 | 50.0 | 0 |
| Ex. 8 | 266.7 | 152.4 | 93 | 91 | 47 | 11 | 1.6 | 46.0 | 0 |
| Ex. 9 | 266.7 | 152.4 | 94 | 86 | 51 | 9 | 1.5 | 50.0 | 0 |
| Ex. 10 | 266.7 | 152.4 | 94 | 102 | 50 | 10 | 1.3 | 46.0 | 0 |
| Ex. 11 | 266.7 | 152.4 | 94 | 97 | 51 | 11 | 1.4 | 45.0 | 0 |
| Ex. 12 | 266.7 | 152.4 | 94 | 76 | 50 | 11 | 2.0 | 45.0 | 0 |
| Ex. 13 | 266.7 | 152.4 | 94 | 81 | 49 | 10 | 1.7 | 43.0 | 0 |
| Ex. 14 | 266.7 | 152.4 | 94 | 91 | 55 | 19 | 2.6 | 33.0 | 25 |
| Ex. 15 | 266.7 | 152.4 | 93 | 89 | 55 | 10 | 2.2 | 46.0 | 0 |
| Ex. 16 | 266.7 | 152.4 | 93 | 91 | 52 | 19 | 3.0 | 30.0 | 30 |
| Ex. 17 | 266.7 | 152.4 | 93 | 86 | 45 | 8 | 1.3 | 49.0 | 0 |
| Ex. 18 | 266.7 | 152.4 | 94 | 91 | 45 | 10 | 1.8 | 52.0 | 0 |
| Ex. 19 | 266.7 | 152.4 | 93 | 89 | 49 | 8 | 1.6 | 48.0 | 0 |
| Ex. 20 | 266.7 | 152.4 | 93 | 104 | 50 | 12 | 1.0 | 44.0 | 0 |
| Ex. 21 | 266.7 | 152.4 | 93 | 64 | 49 | 10 | 2.5 | 43.0 | 0 |
| Comp. Ex. 1 | 266.7 | 152.4 | 92 | 94 | 40 | 6 | 0.2 | 54.0 | 0 |
| Comp. Ex. 2 | 266.7 | 152.4 | 94 | 89 | 57 | 20 | 3.2 | 28.0 | 30 |
| Comp. Ex. 3 | 266.7 | 152.4 | 93 | 91 | 50 | 20 | 4.3 | 34.0 | 35 |

For the partition wall of the honeycomb structure of Example 1, "Porosity (%)", "Average pore diameter (μm)", "Pore volume ratio of the first pores (%)", "Pore volume ratio of the second pores (%)", and "Value of the pore diameter between peaks of the pore diameter distribution (μm)" were obtained. Table 1 shows the result. The "Value of the pore diameter between peaks of the pore diameter distribution (μm)" means a difference between the value of the pore diameter of the maximum peak of the pore volume and the value of the pore diameter of the quasi-maximum peak second to the maximum peak in the pore diameter distribution of the partition wall. When the value of the pore diameter between the peaks in the pore diameter distribution is 0 μm, this means that the pore diameter distribution of the partition wall is a unimodal distribution.

Porosity of the partition wall was measured using Autopore 9500 (product name) produced by Micromeritics Co. To measure the porosity, a part of the partition wall was cut out from the honeycomb structure to prepare a test piece, and the porosity of the obtained test piece was measured. The test piece was a cuboid of about 10 mm, about 10 mm and about 10 mm in length, width, and height, respectively. The test piece was cut out from a part close to the center in the axial direction of the honeycomb structure.

Overall pore volume of the partition wall was measured using Autopore 9500 (product name) produced by Micromeritics Co. The overall pore volume also was measured using the same test piece as in the measurement of the porosity. During measurement of the overall pore volume, the cumulative pore volume of the partition wall was measured, and the "Pore volume ratio of the first pores (%)" and the "Pore volume ratio of the second pores (%)" as described above also were measured at the same time. The "Value of the pore diameter between peaks of the pore diameter distribution (μm)" was also calculated based on the obtained measurement results.

For the honeycomb structure of Example 1, the porosity of the partition wall was 49%, and the average pore diameter was 11.0 μm. The pore volume ratio of the first pores was 1.8%, and the pore volume ratio of the second pores was 45.0%. The pore diameter distribution of the partition wall was a unimodal distribution, meaning that the value of the pore diameter between the peaks in the pore diameter distribution was 0 μm.

Catalyst was loaded on the partition wall of the honeycomb structure of Example 1 by the following method. Firstly catalyst slurry containing zeolite having the average particle diameter of 5 μm was prepared. This catalyst slurry was loaded on the honeycomb structure so that the loading amount per unit volume after drying was 230 g/L. To load the catalyst, the honeycomb structure was performed dipping into the catalyst slurry, followed by air-blowing to blow off the extra catalyst slurry to impregnate. This was dried at the temperature of 120° C., followed by heat treatment at 500° C. for 3 hours, whereby a honeycomb structure loaded with the catalyst was obtained. The loading amount of the catalyst at the honeycomb structure of Example 1 was 231 g/L.

TABLE 2

|  | Filling rate of catalyst (%) | Isostatic strength (MPa) | Pressure loss evaluation (%) | Purifying performance evaluation (%) |
| --- | --- | --- | --- | --- |
| Ex. 1 | 63.0 | 2.0 | −16 | 58.5 |
| Ex. 2 | 65.0 | 1.8 | −18 | 58.6 |
| Ex. 3 | 72.0 | 1.1 | −20 | 59.5 |
| Ex. 4 | 63.0 | 1.7 | −17 | 58.8 |
| Ex. 5 | 76.0 | 1.4 | −20 | 58.4 |
| Ex. 6 | 74.0 | 1.5 | −19 | 58.4 |
| Ex. 7 | 45.0 | 2.9 | −11 | 58.4 |
| Ex. 8 | 60.0 | 2.8 | −15 | 58.5 |
| Ex. 9 | 45.0 | 2.5 | −12 | 58.6 |
| Ex. 10 | 62.0 | 3.2 | −6 | 58.5 |
| Ex. 11 | 63.0 | 3.0 | −9 | 58.7 |
| Ex. 12 | 60.0 | 1.2 | −19 | 58.4 |
| Ex. 13 | 62.0 | 1.4 | −17 | 58.1 |
| Ex. 14 | 80.0 | 0.7 | −23 | 59.7 |
| Ex. 15 | 60.0 | 0.8 | −17 | 59.0 |
| Ex. 16 | 78.0 | 0.9 | −21 | 58.4 |
| Ex. 17 | 40.0 | 3.2 | −10 | 58.5 |
| Ex. 18 | 58.0 | 3.0 | −14 | 58.6 |
| Ex. 19 | 42.0 | 2.4 | −11 | 58.7 |
| Ex. 20 | 64.0 | 3.6 | −5 | 58.4 |
| Ex. 21 | 63.0 | 0.7 | −25 | 58.8 |
| Comp. Ex. 1 | 20.0 | 4.0 | −5 | 58.0 |
| Comp. Ex. 2 | 80.0 | 0.6 | −24 | 60.0 |
| Comp. Ex. 3 | 70.0 | 0.6 | −18 | 57.0 |

For the honeycomb structure of Example 1, the "Filling rate of catalyst (%)" of was obtained by the following method. For the honeycomb structure of Example 1, the "Isostatic strength (MPa)" was measured by the following method. For the honeycomb structure of Example 1, the "Pressure loss evaluation (%)" and the "Purifying performance evaluation (%)" were conducted by the following method. Table 2 shows the results.

(Filling Rate of Catalyst (%))

From the honeycomb structure body of the honeycomb structure in Example 1, a test piece for measurement of 20 mm in length, 20 mm in width, and 20 mm in height, was cut out. The partition wall of this test piece was polished, and then SEM images of three fields of view were captured at random with a scanning electron microscope (SEM). The dimensions of one field of view of the captured field of view was the thickness (μm) of one partition wall in direction X and 600 μm in direction Y. Then when the honeycomb structure was loaded with catalyst, the ratio (percentage) of the volume ($V_1$) of the pores that were actually filled with the catalyst relative to the volume ($V_0$) of all of the pores formed in the partition wall was obtained. Specifically, the images were analyzed to extract part of the pores (that is, pores impregnated with the catalyst and pores not impregnated with the catalyst) by binarization, and then the volume ($V_0$) of all of the pores formed in the partition wall was calculated. Next, the honeycomb structure was loaded with the catalyst, and the images were analyzed to extract a part of the pores impregnated with the catalyst by binarization and then the volume $V_1$ was obtained. Then based on these values, the filling rate of the catalyst (%) was calculated in each SEM image. Table 2 shows the value of the filling rate of catalyst (%) that was the arithmetic mean value of the catalyst filling rates of the SEM images in three fields of view. When the filling rate of catalyst (%) in Table 2 was 40% or more, the honeycomb structure was accepted.

(Isostatic Strength (MPa))

Isostatic breaking strength was measured in accordance with the isostatic breaking strength testing specified at M505-87 of the automotive standard (JASO standard) issued by the Society of Automotive Engineers of Japan, Inc. Isostatic breaking strength is tested by placing the honeycomb structure in a rubber-made tubular container, which is sealed with an aluminum plate, and then applying an isostatic pressure thereto in water. Isostatic strength measured by this isostatic breaking strength testing is indicated as a pressure (MPa) applied when the honeycomb structure breaks down. When the isostatic strength was 0.7 MPa or more, the honeycomb structure was "accepted", and when the isostatic strength was less than 0.7 MPa, the honeycomb structure was "rejected".

(Pressure Loss Evaluation (%))

The pressure difference between the first end face and the second end face of the reference honeycomb structure at 25° C. was determined. The pressure loss value of the reference honeycomb structure obtained in this way was defined as "P0(%)". The reference honeycomb structure had the same structure of the partition wall as in the honeycomb structure to be evaluated (see Table 1), and the reference honeycomb structure had the partition wall that was not loaded with catalyst. Separately, a pressure difference between the first end face and the second end face of the honeycomb structures loaded with catalyst at the values shown in Table 2 at 25° C. was determined. The pressure loss value of each of the honeycomb structures loaded with catalyst obtained in this way was defined as "P1(%)". Then, as the evaluation value to evaluate the pressure loss, the value was calculated by the following Expression (1). The honeycomb structure having the evaluation value of the following Expression (1) that was −5% or less was accepted.

Evaluation value of pressure loss=$(P1-P0)/P0 \times 100\%$   Expression (1):

(Purifying Performance Evaluation (%))

Firstly, test gas containing NOx was fed into the honeycomb structure. Then, the amount of NOx in the gas emitted from this honeycomb structure was analyzed by a gas analyzer. The temperature of the test gas flowing through the honeycomb structure was 200° C. The temperatures of the honeycomb structure and the test gas were adjusted by a heater. For the heater, an infrared image furnace was used. For the test gas, 5 volume % of carbon dioxide, 14 volume % of oxygen, 350 ppm of nitric monoxide (volumetric basis), 350 ppm of ammonia (volumetric basis), and 10 volume % of water were mixed with nitrogen. To prepare this test gas, water and the mixture gas of other gases were separately prepared, and they were mixed in the tube to use in the test. As the gas analyzer, "MEXA9100EGR manufactured by HORIBA, Ltd." was used. The space velocity of the test gas flowing into the honeycomb structure was 100,000 (hour). The column of "Purifying performance evaluation (%)" in Table 2 shows the NOx purifying rate obtained by subtracting the amount of NOx in the gas emitted from the honeycomb structure from the amount of NOx in the test gas, dividing the result by the amount of NOx in the test gas and multiplying the result by 100. Since the NOx purifying rate of the reference standard honeycomb structure was 58.0%, the honeycomb structure having the NOx purifying rate of 58.0% or more was accepted. The reference honeycomb structure was the same as that used for "Pressure loss evaluation (%)".

Examples 2 to 21

Honeycomb structures of Examples 2 to 21 were manufactured by changing the structure of the partition wall as in Table 1. The "Average pore diameter (μm)", the "Pore volume ratio of first pores (%)", the "Pore volume ratio of second pores (%)" and the "Value of the pore diameter between peaks in the pore diameter distribution (μm)" were adjusted by adjusting the particle diameter of the pore former added to the forming raw material.

In Example 2, the pore former having the average particle diameter of 28 μm was used.

In Example 3, the pore former having the average particle diameter of 38 μm was used.

In Example 4, the pore former having the average particle diameter of 28 μm was used.

In Example 5, the pore former having the average particle diameter of 70 μm was used.

In Example 6, the pore former having the average particle diameter of 70 μm was used.

In Example 7, the pore former having the average particle diameter of 10 μm was used.

In Example 8, the pore former having the average particle diameter of 28 μm was used.

In Example 9, the pore former having the average particle diameter of 22 μm was used.

In Example 10, the pore former having the average particle diameter of 28 μm was used.

In Example 11, the pore former having the average particle diameter of 28 μm was used.

In Example 12, the pore former having the average particle diameter of 28 μm was used.

In Example 13, the pore former having the average particle diameter of 28 μm was used.

In Example 14, the pore former having the average particle diameter of 70 μm was used.

In Example 15, the pore former having the average particle diameter of 28 μm was used.

In Example 16, the pore former having the average particle diameter of 70 μm was used.

In Example 17, the pore former having the average particle diameter of 10 μm was used.

In Example 18, the pore former having the average particle diameter of 28 μm was used.

In Example 19, the pore former having the average particle diameter of 22 μm was used.

In Example 20, the pore former having the average particle diameter of 28 μm was used.

In Example 21, the pore former having the average particle diameter of 28 μm was used.

Comparative Examples 1 to 3

Honeycomb structures of Comparative Examples 1 to 3 were manufactured by changing the partition wall configuration as in Table 1. The "Average pore diameter (μm)", the "Pore volume ratio of first pores (%)", the "Pore volume ratio of second pores (%)" and the "Value of the pore diameter between peaks of the pore diameter distribution (μm)" were adjusted by adjusting the particle diameter of the pore former added to the forming raw material.

In Comparative Example 1, the pore former having the average is particle diameter of 10 μm was used.

In Comparative Example 2, the pore former having the average particle diameter of 70 μm was used.

In Comparative Example 3, the pore former having the average particle diameter of 100 μm was used.

For the honeycomb structures of Examples 2 to 21 and Comparative Examples 1 to 3, the "Filling rate of catalyst (%)" and the "Isostatic strength (MPa)" were measured by the method similar to Example 1. The "Pressure loss evaluation (%)" and the "Purifying performance evaluation (%)" also were conducted by the method similar to Example 1. Table 2 shows the results.

(Results)

The honeycomb structures of Examples 1 to 21 suppressed a decrease in isostatic strength and an increase in pressure loss and had excellent purifying performance. The honeycomb structures of Comparative Example 1 had a low filling rate of catalyst, and a lot of catalyst was loaded on the surface of the partition wall. This honeycomb structure therefore had a high pressure loss. The honeycomb structures of Comparative Examples 2 and 3 had a high pore volume ratio of the first pores, and had a high filling rate of catalyst. These honeycomb structures of Comparative Examples 2 and 3, however, greatly decreased in isostatic strength relative to the reference honeycomb structure. For a pore diameter distribution of the pores formed in the partition wall, the honeycomb structure of Comparative Example 3 had a multimodal distribution having the value of the pore diameter between the peaks that was 35 μm as shown in Table 2. Such a honeycomb structure of Comparative Example 3 showed a low value in the purifying performance evaluation as well.

The honeycomb structure of the present invention can be used for a catalyst carrier to be loaded with catalyst to purify exhaust gas.

DESCRIPTION OF REFERENCE NUMERALS

1: partition wall, 2: cell, 10: honeycomb structure body, 11: first end face, 12: second end face, 20: circumferential wall, 100: honeycomb structure

What is claimed is:

1. A honeycomb structure comprising a pillar-shaped honeycomb structure body having a porous partition wall disposed so as to surround a plurality of cells which serve as fluid through channel extending from a first end face to a second end face, wherein
    a major component of the partition wall is cordierite,
    a porosity of the partition wall measured by mercury press-in method is 45 to 55%,
    an average pore diameter of the partition wall measured by mercury press-in method is 8 to 19 μm,
    among pores formed in the partition wall, pores having a pore diameter larger than a thickness T1 of the partition wall are referred to as first pores, and pores having a pore diameter of 10 μm or less are referred to as second pores,
    a cumulative pore volume of the partition wall measured by mercury press-in method is such that a pore volume ratio of the first pores relative to an overall pore volume of the partition wall is 3.0% or less, and a pore volume ratio of the second pores relative to the overall pore volume of the partition wall is 30% or more, and
    a pore diameter distribution of the partition wall is a unimodal distribution, or is a multimodal distribution in which a difference between a value of a pore diameter of a maximum peak of the pore volume and a value of a pore diameter of a quasi-maximum peak second to the maximum peak is 30 μm or less.

2. The honeycomb structure according to claim 1, wherein the porosity of the partition wall measured by mercury press-in method is 47 to 53%,
    the average pore diameter of the partition wall measured by mercury press-in method is 9 to 18 μm,
    the cumulative pore volume of the partition wall measured by mercury press-in method is such that a pore volume ratio of the first pores relative to an overall pore volume of the partition wall is 2.5% or less, and a pore volume ratio of the second pores relative to the overall pore volume of the partition wall is 35% or more, and
    the pore diameter distribution of the partition wall is a unimodal distribution, or is a multimodal distribution in which a difference between a value of a pore diameter of a maximum peak of the pore volume and a value of a pore diameter of a quasi-maximum peak second to the maximum peak is 28 μm or less.

3. The honeycomb structure according to claim 1, wherein a thickness T1 of the partition wall is 64 to 104 μm.

4. The honeycomb structure according to claim 1, wherein a cell density of the honeycomb structure body is 85 to 101 cells/cm$^2$.

5. The honeycomb structure according to claim 1, wherein the pore diameter distribution of the partition wall is a unimodal distribution or a bimodal distribution.

6. The honeycomb structure according to claim 1, wherein the partition wall includes 90 mass % or more of cordierite in the constituent components.

* * * * *